US012781449B2

(12) United States Patent
Yokoyama et al.

(10) Patent No.: US 12,781,449 B2
(45) Date of Patent: Nov. 3, 2026

(54) ROAD INSPECTION SYSTEM, ROAD INSPECTION METHOD AND PROGRAM RECORDING MEDIUM

(71) Applicant: NEC Corporation, Tokyo (JP)

(72) Inventors: Natsumi Yokoyama, Tokyo (JP); Shintaro Chiku, Tokyo (JP); Yoko Tanaka, Tokyo (JP); Yuki Tsuji, Tokyo (JP); Kosei Kobayashi, Tokyo (JP); Kazuki Ogata, Tokyo (JP); Kei Yanagisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 680 days.

(21) Appl. No.: 18/267,515

(22) PCT Filed: Dec. 23, 2020

(86) PCT No.: PCT/JP2020/048074
§ 371 (c)(1),
(2) Date: Jun. 15, 2023

(87) PCT Pub. No.: WO2022/137369
PCT Pub. Date: Jun. 30, 2022

(65) Prior Publication Data

US 2024/0035239 A1 Feb. 1, 2024

(51) Int. Cl.
*E01C 23/01* (2006.01)
*G01C 21/34* (2006.01)

(52) U.S. Cl.
CPC .......... *E01C 23/01* (2013.01); *G01C 21/3453* (2013.01)

(58) Field of Classification Search
CPC ............................ E01C 23/01; G01C 21/3453
(Continued)

(56) References Cited

U.S. PATENT DOCUMENTS 4,571,695 A * 2/1986 Elton .................. G01M 5/0058 702/167
7,044,680 B2 * 5/2006 Godbersen .............. E01C 23/07 404/75
(Continued)

FOREIGN PATENT DOCUMENTS

DE 102004048637 A1 * 4/2006 ............. E01C 23/01
JP 2005-115687 A 4/2005
(Continued)

OTHER PUBLICATIONS

International Search Report for PCT Application No. PCT/JP2020/048074, mailed on Mar. 23, 2021.
(Continued)

*Primary Examiner* — Raymond W Addie
(74) *Attorney, Agent, or Firm* — Sughrue Mion, PLLC

(57) ABSTRACT

A road inspection system comprises: a means that creates a road inspection route including a first road managed by a first road manager and a second road managed by a second road manager which is different from the first road manager; a means that receives inspection data from a vehicle that has traveled along a road inspection route, in which the inspection data is obtained by measurement of pre-set items along the road inspection route; a means that diagnoses a first inspection data, that is included in the inspection data and measured on the first road, using first diagnosis criteria of the first road manager; and a means that diagnoses a second inspection data, that is included in the inspection data and measured on the second road, using second diagnosis criteria of the second road manager.

9 Claims, 10 Drawing Sheets

(58) Field of Classification Search
USPC .......................... 404/72, 75, 84.05–84.5, 118
See application file for complete search history.

(56) References Cited

U.S. PATENT DOCUMENTS

| | | | | |
|---|---|---|---|---|
| 10,742,479 | B2 * | 8/2020 | Gotoh | G01C 21/28 |
| 10,915,914 | B2 * | 2/2021 | Viswanathan | G01C 21/3841 |
| 2010/0129152 | A1 * | 5/2010 | Taylor | E01C 23/07 404/75 |
| 2010/0292926 | A1 * | 11/2010 | Yang | G01C 7/04 702/5 |
| 2012/0321385 | A1 * | 12/2012 | Hanfland | G01B 21/08 404/84.1 |
| 2014/0062725 | A1 * | 3/2014 | Maston | G08G 1/0141 340/905 |
| 2018/0327023 | A1 * | 11/2018 | Buschmann | E01C 19/22 |
| 2019/0345678 | A1 * | 11/2019 | Sohn | B60W 40/06 |

FOREIGN PATENT DOCUMENTS

| | | | |
|---|---|---|---|
| JP | 2016-089593 | A | 5/2016 |
| JP | 2017-117323 | A | 6/2017 |
| JP | 2018-190264 | A | 11/2018 |
| JP | 2019-096026 | A | 6/2019 |
| WO | 2018/066116 | A1 | 4/2018 |
| WO | 2018/066117 | A1 | 4/2018 |

OTHER PUBLICATIONS

Kousuke Matsushima et al., “Pothole Detection in Road Images”, IEICE Technical Report, vol. 114, No. 369, Dec. 11, 20114, pp. 103-107.

Nobuo Sano et al., “Propose of a Rational Inspection System of Highway Tunnel”, vol. 63, No. 3, pp. 391-400, 2007, [retrieved on Mar. 11, 2021], Internet: <URL:https://www.jstage.jst.go.jp/article/jscejd/63/3/63_3_391/_pdf>.

* cited by examiner

FIG. 3
| ROAD NAME | MANAGING DEPARTMENT (ROAD MANAGER) | INSPECTION DATE AND TIME |
|---|---|---|
| NATIONAL ROAD AAA | AA LOCAL MAINTENANCE DEPARTMENT | 2020/4/XX 12:00 |
| SECTION | CRACK RATE | AMOUNT OF RUT DEPTH | IRI | IMAGE |
|---|---|---|---|---|
| 0-100 | 10% | 5mm | 0.5mm/m | 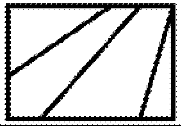 |
| 100-200 | 12% | 15mm | 1.0mm/m |  |
| 200-300 | 8% | 7mm | 0.8mm/m |  |
| : | | | | |

FIG. 4

PERFORMANCE EVALUATION STANDARD OF ROAD MANAGER A

| CLASSIFICATION | CRACK RATE | RUT DEPTH | IRI |
|---|---|---|---|
| I GOOD | LESS THAN 15% | LESS THAN 20mm | LESS THAN 2mm/m |
| II MAINTENANCE REQUIRED | 15% OR MORE | 20mm OR MORE | 2mm/m OR MORE |
| III REPAIR REQUIRED | 20% OR MORE | 25mm OR MORE | 3.5mm/m OR MORE |

PERFORMANCE EVALUATION STANDARD OF ROAD MANAGER B

| CLASSIFICATION | CRACK RATE | RUT DEPTH | IRI |
|---|---|---|---|
| I GOOD | LESS THAN 20% | LESS THAN 20mm | LESS THAN 3mm/m |
| II MAINTENANCE REQUIRED | 20% OR MORE | 20mm OR MORE | 3mm/m OR MORE |
| III REPAIR REQUIRED | 40% OR MORE | 40mm OR MORE | 8mm/m OR MORE |

ROAD INSPECTION SYSTEM, ROAD INSPECTION METHOD AND PROGRAM RECORDING MEDIUM

This application is a National Stage Entry of PCT/JP2020/048074 filed on Dec. 23, 2020, the contents of all of which are incorporated herein by reference, in their entirety.

TECHNICAL FIELD

The present invention relates to a road inspection system, a road inspection method and a program recording medium.

BACKGROUND

Patent Literature 1 (PTL 1) discloses a road maintenance support system, in which an inspection terminal mounted on a vehicle may perform road inspection. According to this literature, the road maintenance support system comprises: an inspection terminal that inspects deterioration state of a road using a camera, a microphone, a sound sensor, and a vibration sensor and sends an inspection result to a repair-inspection plan creation apparatus; and the repair-inspection plan creation apparatus that creates inspection plan including inspection routes and inspection contents based on a past inspection history and sends the inspection plan to the inspection terminal.

A road manager repairs and maintains a road based on the inspection result of the road and makes a plan for maintenance. Patent Literature 2 (PTL 2) diagnoses a road management system that may quantitatively diagnoses a necessity for repairment and improvement of a road.

PTL 1: Tokkai JP-P2017-117323A

PTL 2: Tokkai JP-P2005-115687A

SUMMARY

The following analysis is provided by a present inventor. The above described road inspection is usually operated by each of management entities (road managers), such as a national government, a prefecture, a city, a specific company, and the like. However, an inspection route on which a vehicle travels is not always consistent with a road line as an inspection target. Further, in a case where the road has a long distance, because of restriction in budget, it is required to divide the road into plural sections and perform repairment of the road according to planning. Under such aspect, the road inspection is often performed along divided schedules. Therefore, even in a case where an inspection is performed by, for example, the road maintenance support system of PTL 1, a plurality of inspection routes is created, and the inspection is performed stage by stage.

The inspection route created based on such aspect involves a case where the inspection route includes a road section that is not roads managed by a management entity that is an inspection operation entity. In such case, no inspection is performed on such road section, thus one kind of loss occurs. Further, even if the inspection is performed on the road section concerned, there would be a problem that the measured inspection data cannot be used, since each of the management entities sets different road performance evaluation items and different road diagnosis criteria based on values thereof.

It is a purpose of the present invention to provide a road inspection system, a road inspection method and a program recording medium that may contribute to enhance efficiency of inspection (diagnosis) of a plurality of roads of different management entities (road managers).

Solution to Problem

According to a first aspect, there is provided a road inspection system, comprising: a means that creates a road inspection route including a first road managed by a first road manager and a second road managed by a second road manager which is different from the first road manager; a means that receives inspection data from a vehicle that has traveled along a road inspection route, in which the inspection data is obtained by measurement of pre-set items along the road inspection route; a means that diagnoses a first inspection data, that is included in the inspection data and measured on the first road, using first diagnosis criteria of the first road manager; and a means that diagnoses a second inspection data, that is included in the inspection data and measured on the second road, using second diagnosis criteria of the second road manager.

According to a second aspect, there is provided a road inspection method, wherein a computer comprising a means that stores road data including a first road managed by a first road manager and a second road managed by a second road manager which is different from the first road manager executes: creating a road inspection route including the first road managed by the first road manager and the second road managed by the second road manager which is different from the first road manager; receiving inspection data from a vehicle that has traveled along a road inspection route, in which the inspection data is obtained by measurement of pre-set items along the road inspection route; diagnosing a first inspection data, that is included in the inspection data and measured on the first road, using first diagnosis criteria of the first road manager; and diagnosing a second inspection data, that is included in the inspection data and measured on the second road, using second diagnosis criteria of the second road manager. The method is connected to a specific machine that is the computer comprising the means storing the road data.

According to a third aspect, there is provided a computer program (referred to as "program" hereinafter) realizing functions of the road inspection system described above. The program is input into a computer apparatus via a communication interface from an input apparatus or an external, stored in a storage apparatus, and operates a processor predetermined steps or processes. In addition, the program may display a process result of each stage including intermediate states via a display apparatus, as necessary, or communicate to the external via the communication interface. A computer apparatus for such purpose, as one example, comprises a processor, a storage apparatus, an input apparatus, a communication interface and a display apparatus, as necessary, which are typically connected mutually with a bus.

Advantageous Effects of Invention

According to the present invention, it is realized to efficiently inspect a plurality of roads of different management entities (road managers).

BRIEF DESCRIPTION OF THE DRAWINGS

FIG. 3 is a diagram showing one example of inspection data that is received from a vehicle by the road inspection system of the first example embodiment of the present invention.

FIG. 4 is a diagram showing one example of performance evaluation criteria of respective road managers that are held by the road inspection system of the first example embodiment of the present invention.

EXAMPLE EMBODIMENTS

Figure 1:
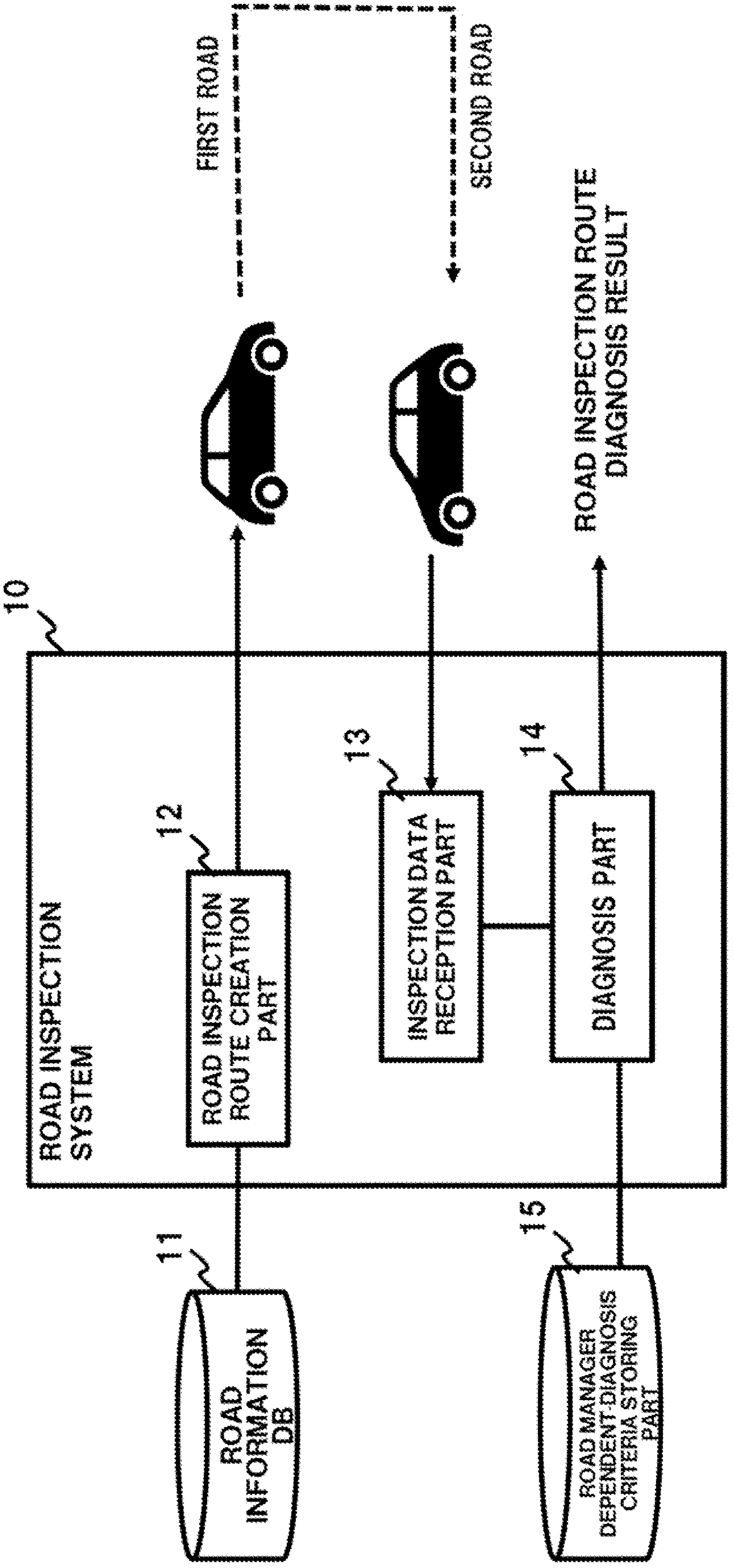
FIG. 1 is a diagram showing a configuration of one example embodiment of the present invention.

First, an outline of an example embodiment 1 of the present invention is explained while reference to drawings. Herein, reference signs appended to the outline are expediently appended to each element as one example for a purpose of helping understanding, thus are not intended to limit the present invention to an illustrated mode. In addition, connection lines between blocks in drawings and the like, made reference in the following explanation, include both of bidirectional and mono directional. One way arrow schematically indicates flow of a main signal (data), thus does not exclude bidirectionality. A program is executed via a computer apparatus, and the computer apparatus comprises, for example, a processor, a storage apparatus, an input apparatus, a communication interface and a display apparatus, as necessary. Further, the computer apparatus is configured in a manner capable of communicating with an internal equipment or an external equipment (including a computer) via the communication interface, irrespective of a cable communication or a radio communication. In addition, input/output connection points of each block in the drawings have ports or interface, although illustration is abbreviated in the drawings.

The present invention is, in one example embodiment, as shown in FIG. 1, realized by a road inspection system 10 comprising a road inspection route creation part 12, an inspection data reception part 13 and a diagnosis part 14.

The road inspection route creation part 12 performs a function as a means that creates a road inspection route including a first road managed by a first road manager and a second road managed by a second road manager different from the first road manager. In an example illustrated in FIG. 1, the road inspection route creation part 12 reads out data from a road information database (road information DB) 11 including a road ledger (table), a pavement ledger (table), etc., and creates the road inspection route.

The inspection data reception part 13 performs a function as a means that receives inspection data from a vehicle that has traveled along the road inspection route, in which the inspection data is obtained by measurement of pre-set items along the road inspection route. Herein, setting of the road inspection route to a vehicle may adopt a configuration in which an on-board terminal on the vehicle reads a recording medium storing road inspection route information or a configuration in which the road inspection route information is transmitted to the vehicle using a communication means. Of course, a configuration may be also adopted, in which a vehicle occupant inputs the road inspection route to an on-board terminal manually.

The diagnosis part 14 performs a function as a means that diagnoses a first inspection data, that is included in the inspection data and measured on the first road, using first diagnosis criteria of the first road manager, which is stored in a road manager dependent-diagnosis criteria storing part 15. In addition, the diagnosis part 14 also performs a function as a means that diagnoses a second inspection data, that is included in the inspection data and measured on the second road, using second diagnosis criteria of the second road manager, which is stored in the road manager dependent-diagnosis criteria storing part 15. The diagnosis part 14 outputs a result of the diagnosis as a road inspection route diagnosis result. Herein, in the example illustrated in FIG. 1, a configuration is adopted, in which one diagnosis part 14 performs diagnosis using the first and second diagnosis criteria. However, a configuration may be also adopted, in which multiple diagnosis parts are arranged for each of diagnosis criteria.

Further, in the example illustrated in FIG. 1, the road information database (road information DB) 11 and the road manager dependent-diagnosis criteria storing part 15 are arranged as separated apparatuses from the road inspection system 10. However, a storage apparatus of the road inspection system 10 may store information corresponding to the road information DB11 and the road manager dependent-diagnosis criteria storing part 15 (see FIG. 2).

According to the above road inspection system 10, it is realized that a road manager creates a road inspection route including a plurality of roads of different road managers to be inspected by a vehicle. In addition, according to the road inspection system 10, a diagnosis may be performed based on inspection data received from the vehicle using diagnosis criteria respectively set by road managers so as to obtain a diagnosis result.

First Example Embodiment

Figure 2:
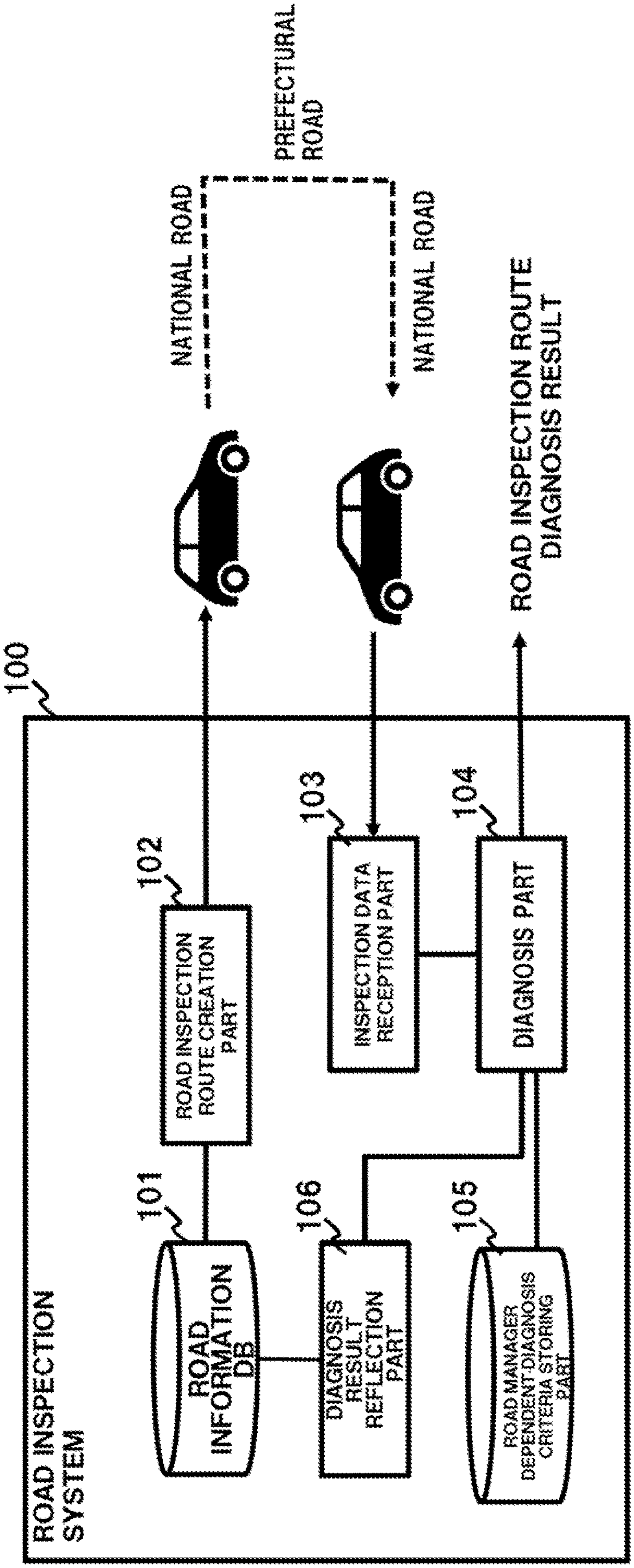
FIG. 2 is a diagram showing a configuration of a road inspection system of a first example embodiment of the present invention.

Next, a first example embodiment of the present invention is explained in detail while referring to drawings. FIG. 2 is a diagram showing a configuration of a road inspection system of the first example embodiment of the present invention. In FIG. 2, a road inspection apparatus 100 is exemplified, which may receive inspection data from a road inspection vehicle comprising a road inspection apparatus. As the road inspection vehicle comprising the road inspection apparatus, for example, a vehicle may be used, which comprises an inspection apparatus that may measure a crack rate of a road surface, the amount of rut depth on the road surface, and the International Roughness Index (IRI). Of course, a dedicated road surface state measurement vehicle may be used to perform these measurements, or a vehicle equipped with an on-board device such as a general drive recorder with a camera and accelerometer can be used.

Referring to FIG. 2, the road inspection system 100 comprises a road information DB101, a road inspection route creation part 102, an inspection data reception part 103, a diagnosis part 104, a road manager dependent-diagnosis criteria storing part 105, and a diagnosis result reflection part 106.

The road information DB 101 is a database that stores various types of information for creating the road inspection route. The road information DB 101 may be a Geographic Information System with additional management functions for a road table plan view and a record and a pavement ledger. As the road information DB 101, information data of the Road Management System (ROADIS) of the Japan Road Management Center or other road management systems used by various local governments may be used.

Based on an inspection target area selected by a user, the road inspection route creation part 102 creates a road inspection route for roads located in that area. At that time, the user may refer to an inspection implementation status of each route in the road information DB 101 to select an area that is due for inspection. If the area include a first road managed by a first road manager and a second road managed by a second road manager different from the first road manager, the road inspection route creation part 102 creates a road inspection route that includes these first and second roads. Of course, the road inspection system 100 may have a function to correct the created road inspection route through an interactive process with the user. For example, the road inspection route creation part 102 may create a route along which roads that have not been inspected for a given period of time are preferentially inspected, or a route along which sites where complaints from residents have been raised are preferentially inspected. The road inspection route creation part 102 may also refer to past diagnostic results to create a route along which roads that need to be inspected frequently are preferentially inspected.

The road inspection route created by the road inspection route creation part 102 is set to a road inspection vehicle (referred to as "vehicle" hereinafter) in various ways. For example, a route may be set by inputting the same road inspection route created by the road inspection route creation part 102 into a car navigation system or a road inspection device mounted on the vehicle. If the road inspection route creation part 102 is equipped with a function to output road inspection route information to any recording medium, the route may be set to the car navigation system or the road inspection device mounted on the vehicle via the recording medium.

The inspection data reception part 103 receives inspection data measured along the road inspection route from a vehicle that has traveled the road inspection route. The following description is made based on an assumption that the inspection data reception part 103 receives inspection data including a crack rate of a road surface, the amount of rut depth on the road surface, and the International Roughness Index (IRI). In addition, depending on road diagnostic criteria, items other than those listed below, for example, a composite index such as the Maintenance Control Index (MCI) (pavement maintenance index), may be added to the measurement items. If the road diagnostic criteria use another index such as flatness (standard deviation of longitudinal irregularities) instead of the International Roughness Index (IRI), it may be converted from the International Roughness Index (IRI).

FIG. 3 is a diagram showing an example of inspection data received by the road inspection system 100 of the present example embodiment from a vehicle. The example in FIG. 3 indicates ROAD NAME, MANAGING DEPARTMENT (ROAD MANAGER) and INSPECTION DATE AND TIME; as well as inspection data including the crack rate, the amount of rut depth, IRI measurement result and road surface image for each section of the route. If the road inspection route includes routes (roads) managed by different managing departments (road managers), the road inspection system 100 will receive inspection data for different routes (roads) along the measurement time sequence. Although the present example embodiment includes an assumption that the vehicle calculates and transmits the crack rate, the (maximum) amount of rut depth, and IRI for each section, the vehicle may transmit the data necessary to calculate each item so that the side of the road inspection system 100 performs calculation of each item.

Herein, the cracking rate may be calculated by a calculation formula: cracked area ($m^2$)/area of inspection target ($m^2$)*100. Concretely, a mesh method can be used, in which an inspection target section is divided into sections of a predetermined size (e.g., 0.5 m square) divided into sections of a predetermined size (e.g., 0.5 m square), and only one crack in a section is converted to 60% as a rate per area, while two or more cracks having converted to 100%. The crack rate may be calculated by not only the above calculation method, but also by using a method or methods established by local authorities and the like.

The road manager dependent-diagnosis criteria storing part 105 stores road diagnosis criteria which are respectively set by each managing department (road manager). FIG. 4 is an example of diagnosis criteria (performance evaluation criteria) depending on a managing department (road manager) stored in the road manager dependent-diagnosis criteria storing part 105. For example, upper diagnostic criteria of FIG. 4 indicate diagnostic criteria (performance evaluation criteria) of Road Manager A. A road managed by Road administrator A requires road diagnosis performed by whether the content of inspection data matches with any one of categories (classification). Similarly, lower diagnostic criteria of FIG. 4 indicate diagnostic criteria (performance evaluation criteria) of Road Manager B. As exemplified in FIG. 4, there is a case where the diagnosis criteria (performance evaluation criteria) are different one another depending on the managing departments (road managers).

Diagnostic criteria for roads are generally based on the required level of service and the magnitude (progression) of expected damage progression. The road diagnosis criteria are generally set based on the required service level and the degree of expected damage progression (progression level). For example, in Japan, different diagnosis criteria are set respectively to each of a national road, a prefectural road, a municipal road, an expressway and a private road. In addition, there is a case where each of prefectures and municipalities adopts different diagnosis criteria according to affect of climate, salinity and other items. Further, there is a case where the expressway and the like have diagnosis criteria based on original criteria from an aspect in safety.

In addition, there is a case where the same managing department (road manager) sets road classification (road class) according to the degree of damage progress (progression level) and the like. In such case where, there is a case where different diagnosis criteria are set according to the road classification even under the same road manager. The road manager dependent-diagnosis criteria storing part 105 stores diagnosis criteria (performance evaluation criteria) which may be different one another depending on the road manager. Hereinafter, the following assumptions are applied: "MAINTENANCE REQUIRED" in FIG. 4 indicates a state where minor maintenance is required to maintain the functionality of the road; and "REPAIR REQUIRED" indicates a state where entire repair is required since the road has a severe damage.

With respect to the inspection data received by the inspection data reception part 103, the diagnosis part 104 executes diagnosis of roads using diagnosis criteria (performance evaluation criteria) corresponding to the inspection data among the diagnosis criteria (performance evaluation criteria) indicated in FIG. 4. Hereinafter, in the present example embodiment, the diagnosis part 104 diagnoses the section as "REPAIR REQUIRED" in a case where at least one item of the inspection data falls into CLASSIFICATION III of the diagnosis criteria (performance evaluation criteria) in FIG. 4. In addition, the diagnosis part 104 diagnoses the section as "MAINTENANCE REQUIRED" in a case where at least one item of the inspection data falls into CLASSIFICATION II of the diagnosis criteria (performance evaluation criteria) in FIG. 4. If such diagnostic method itself also differs between managing departments (road managers), a diagnostic method respectively depending on a managing department (road manager) may be used. For example, there is a case where a certain road manager has determined that a section should be diagnosed as "MAINTENANCE REQUIRED" if at least 2 items of the inspection data fall into CLASSIFICATION III of the diagnosis criteria (performance evaluation criteria) in FIG. 4. In such case, such differences in diagnosis methods may also be stored in the road manager dependent-diagnosis criteria storing part 105, and the diagnosis part 104 may be made to execute the diagnosis in the same manner.

The diagnosis part 104 executes diagnosis on the inspection data received by the inspection data reception part 103 sequentially as described above, and outputs a result as the road inspection route diagnosis result. In addition, the diagnosis part 104 outputs the road inspection route diagnosis result to the diagnosis result reflection part 106.

The diagnosis result reflection part 106 updates an inspection implementation status of the road in the road information DB 101 using the road inspection route diagnosis result output from the diagnosis part 104.

Figure 5:
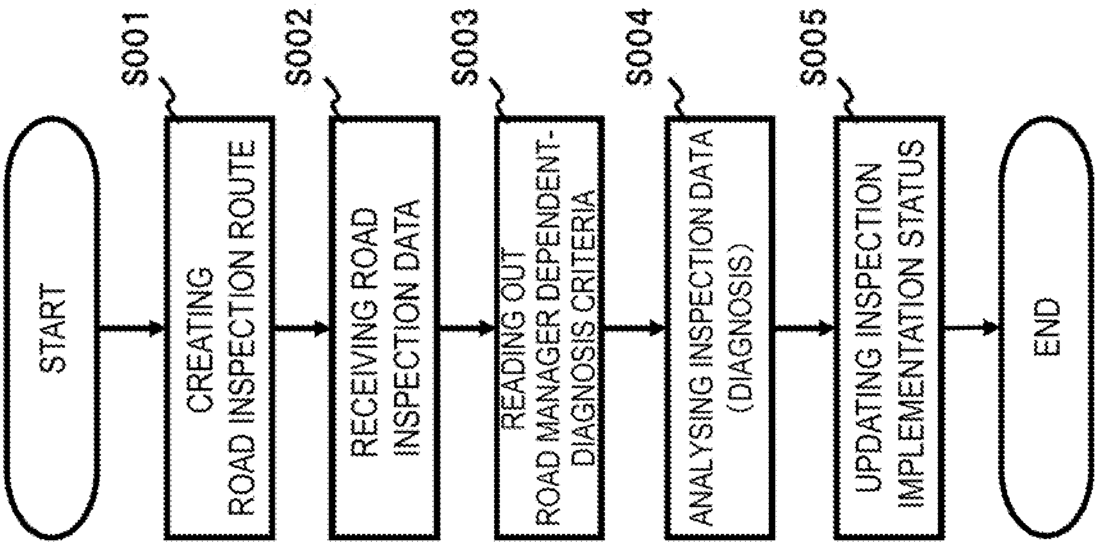
FIG. 5 is a flowchart showing operations by the road inspection system of the first example embodiment of the present invention.

Next, operations in the present example embodiment are explained while referring to Drawings. FIG. 5 is a flowchart indicating operations executed by the road inspection system 100 of the first example embodiment of the present invention. In FIG. 5, in first, the road inspection system 100 creates a road inspection route (Step S001).

Next, the road inspection system 100 receives inspection data from a vehicle (Step S002). Next, the road inspection system 100 reads out diagnosis criteria (diagnosis criteria) of a road manager(s) of road(s) included in the road inspection route from the road manager dependent-diagnosis criteria storing part 105 (Step S003). Herein, if the road inspection route includes roads of a plurality of road managers, the road inspection system 100 reads out respective diagnosis criteria of the road managers.

Next, the road inspection system 100 executes an analysis of the inspection data (diagnosis of roads) using the read-out diagnosis criteria (Step S004). Next, the road inspection system 100 updates the inspection implementation status of the roads in the road information DB 101 using the road inspection route diagnosis result output from the diagnosis part 104 (Step S005).

Figure 6:
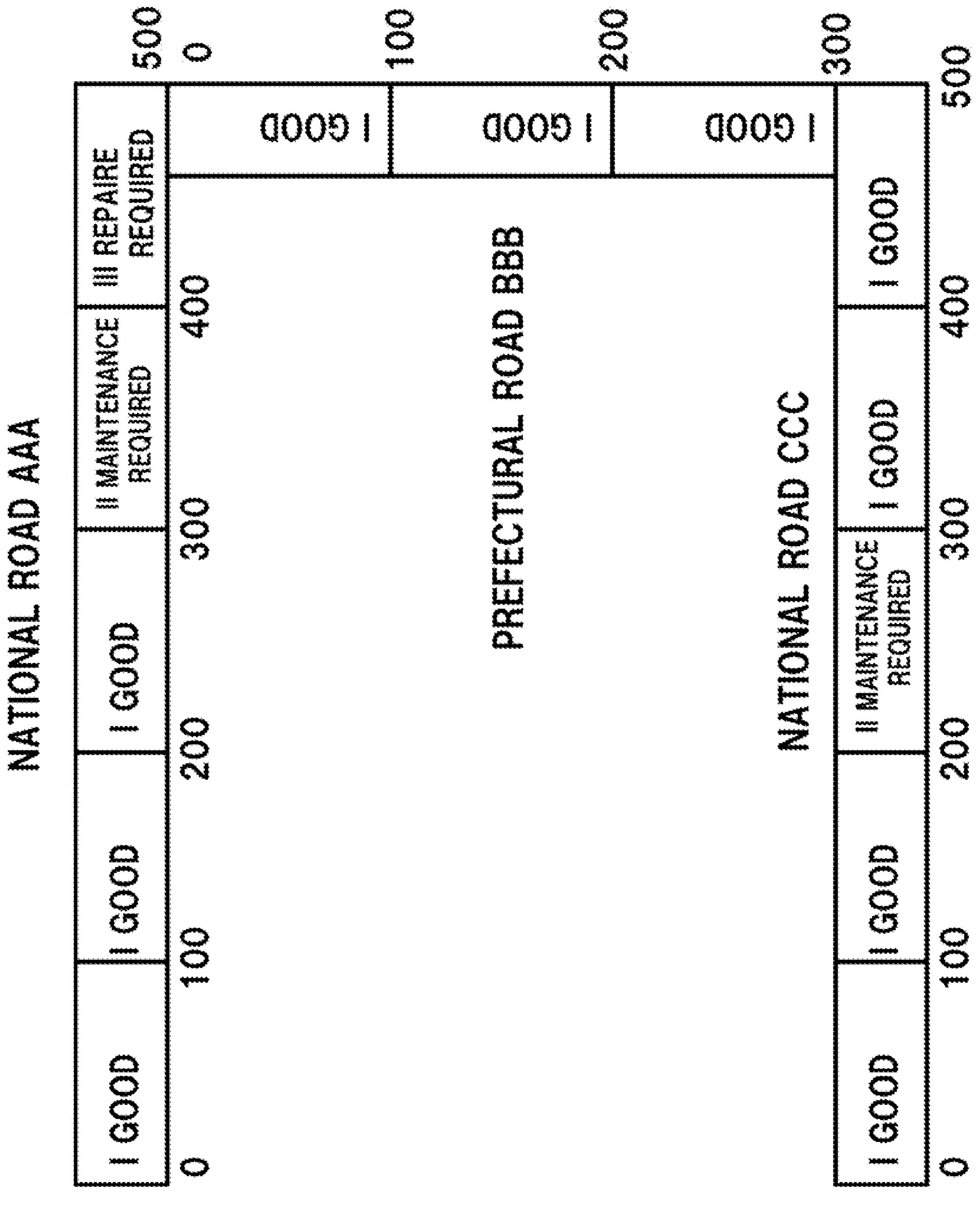
FIG. 6 is a diagram showing a road diagnosis result by the road inspection system of the first example embodiment of the present invention.

FIG. 6 is a diagram showing a road diagnosis result by the road inspection system 100 of the road inspection system 100 of the present invention. In an example of FIG. 6, an example is exemplified, in which a road inspection route includes a NATIONAL ROAD AAA, a PREFECTURE ROAD BBB and a NATIONAL ROAD CCC. In the example of FIG. 6, a section 300 m-400 m of NATIONAL ROAD AAA is determined as MAINTENANCE REQUIRED and a section 400 m-500 m is determined as REPAIRE REQUIRED. Further, a section 200 m-300 m of NATIONAL ROAD CCC is determined as MAINTENANCE REQUIRED. Herein, PREFECTURE ROAD BBB is determined as all GOOD. This is diagnosed according to the diagnostic criteria (performance evaluation criteria) set by a prefectural government who is the road manager of the PREFECTURE ROAD BBB. Therefore, there is also a case where a crack rate, an amount of rut depth and IRI of PREFECTURE ROAD BBB are not determined as GOOD according to the diagnosis criteria (performance evaluation criteria) set by the national government who is the road manager of NATIONAL ROAD AAA and NATIONAL ROAD CCC.

As explained above, according to the present example embodiment, a certain area is selected to create a road inspection route, and then inspection and diagnosis of roads on that route are completed in a single run. It is because that the road inspection route is allowed to include roads of different road managers, and the side of the road inspection system 100 adopts a configuration for selecting and diagnosing diagnosis criteria corresponding to the road managers of the roads on which the inspection data is measured.

Figure 7:
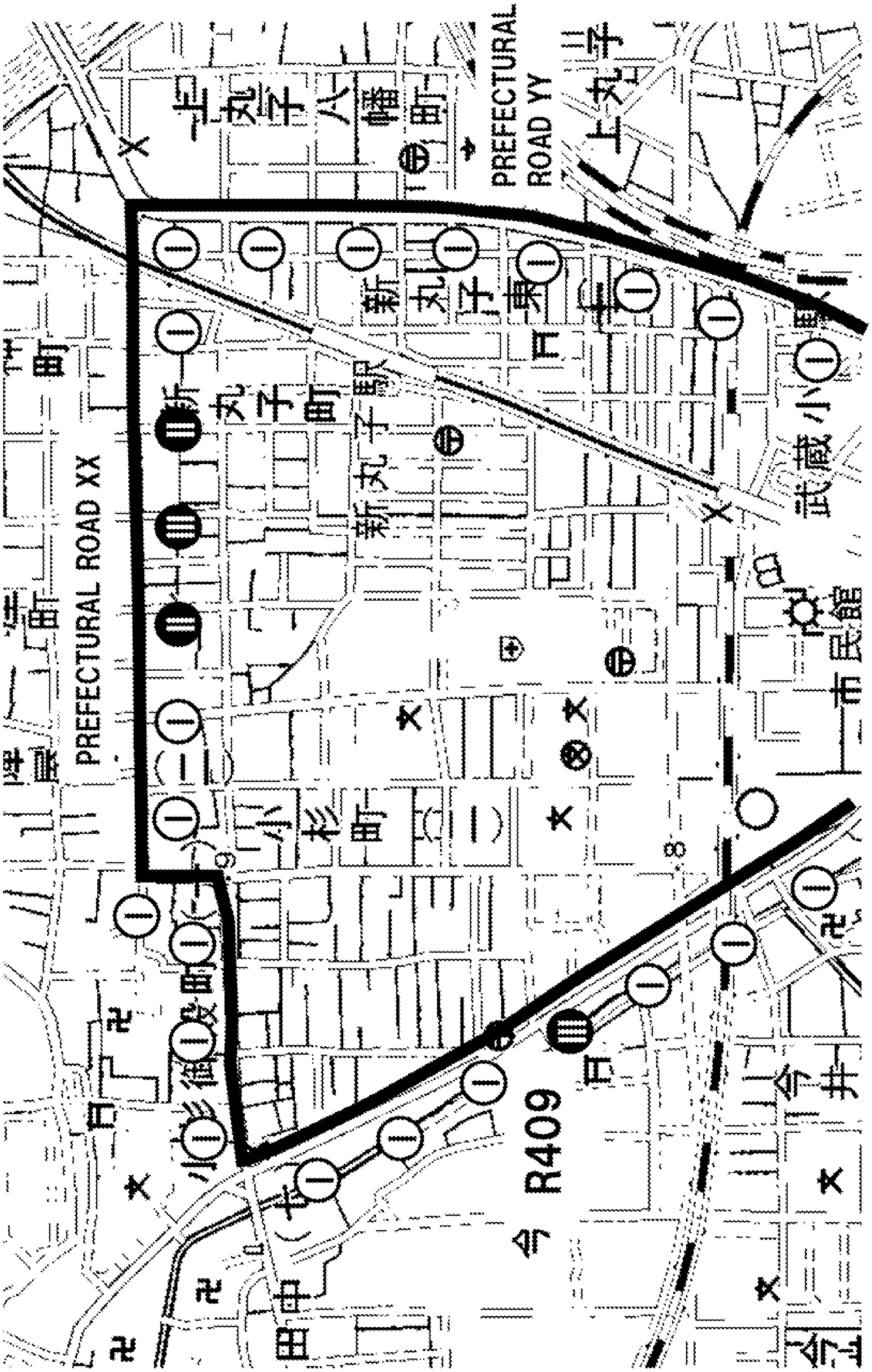
FIG. 7 is a diagram showing one example of a management map as the diagnosis result by the road inspection system of the first example embodiment of the present invention.

Herein, an output model of the road diagnosis result by the road inspection system 100 is not limited to the mode illustrated in FIG. 6. For example, as illustrated in FIG. 7, the road inspection system 100 may comprise a function for creating an inspection operation state map in which a layer indicating the road inspection route and an inspection implementation result is superimposed on GIS map stored in the road information DB 101. In the example of FIG. 7, sections determined as GOOD are marked with a symbol "I" in a circle, and sections determined as MAINTENANCE REQUIRED or REPAIRE REQUIRED are marked with symbols "II" or "III" in white in a black circle. According to the inspection operation state map of FIG. 7, the inspection implementation status, and sections of MAINTENANCE REQUIRED or REPAIRE REQUIRED may be visually comprehended per area unit. Thereby, the inspection implementation status, which had been individually managed on a pavement ledger, and the like of each road manager, may be converted to a plat management (representation). In addition, by providing the diagnosis results or the inspection operation state map to each road administrator, it becomes easier to perform planning of maintenance and repair of roads for each road administrator. Further, in a case where there is a repair company that perform road maintenance on demand of multiple road managers, by providing the diagnosis result or the inspection operation state map to the repair company, it becomes easier to perform planning of surface maintenance and repair of roads.

Second Example Embodiment

Figure 8:
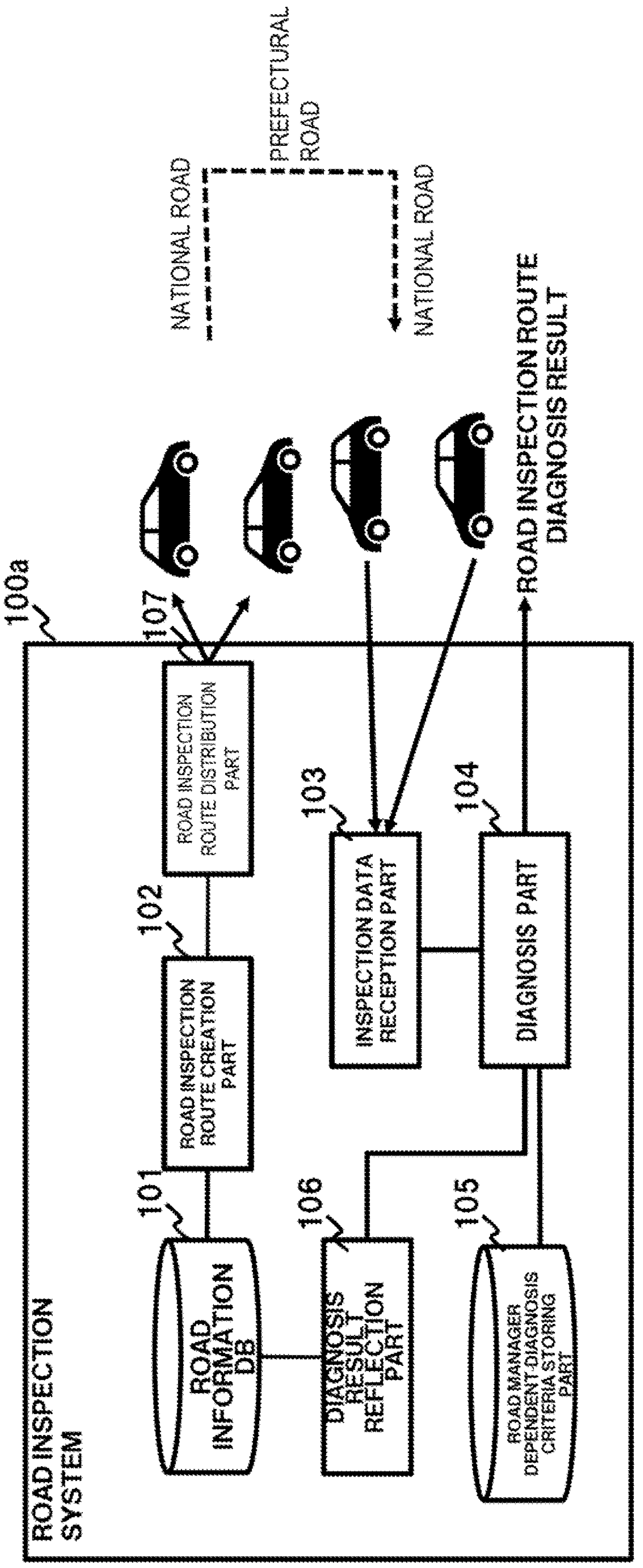
FIG. 8 is a diagram showing a configuration of a road inspection system of a second example embodiment of the present invention.

Next, a second example embodiment is explained in detail while referring to Drawings, in which a distribution function of the road inspection route is added to the road inspection system. FIG. 8 is a diagram showing a configuration of a road inspection system 100*a* of the second example embodiment of the present invention. Difference on the configuration from the first example embodiment illustrated in FIG. 2 is a point that a road inspection route distribution part 107 is added to the road inspection system 100*a*. The other configurations are similar to those of the first example embodiment, thus the difference is explained mainly.

The road inspection route distribution part 107 distributes the road inspection route information created by the road inspection route creation section 102 to vehicles equipped with inspection equipment via wireless networks and the Internet. The road inspection route distribution part 107 distributes the road inspection route information created by the road inspection route creation part 102 to vehicles equipped with an inspection apparatus via wireless networks, Internet, etc. Herein, as illustrate in FIG. 8, the vehicles as distribution destination of the road inspection route information may not be single.

A vehicle which has acquired the road inspection route information travels along the road inspection route to perform inspection, and transmits the inspection data to the road inspection system 100*a*. Herein, the vehicle which has acquired the road inspection route information does not necessarily need to travel the same route as the road inspection route and perform road inspections along the road inspection route, but only needs to transmit inspection data that includes sections that overlap with the road inspection route.

Figure 9:
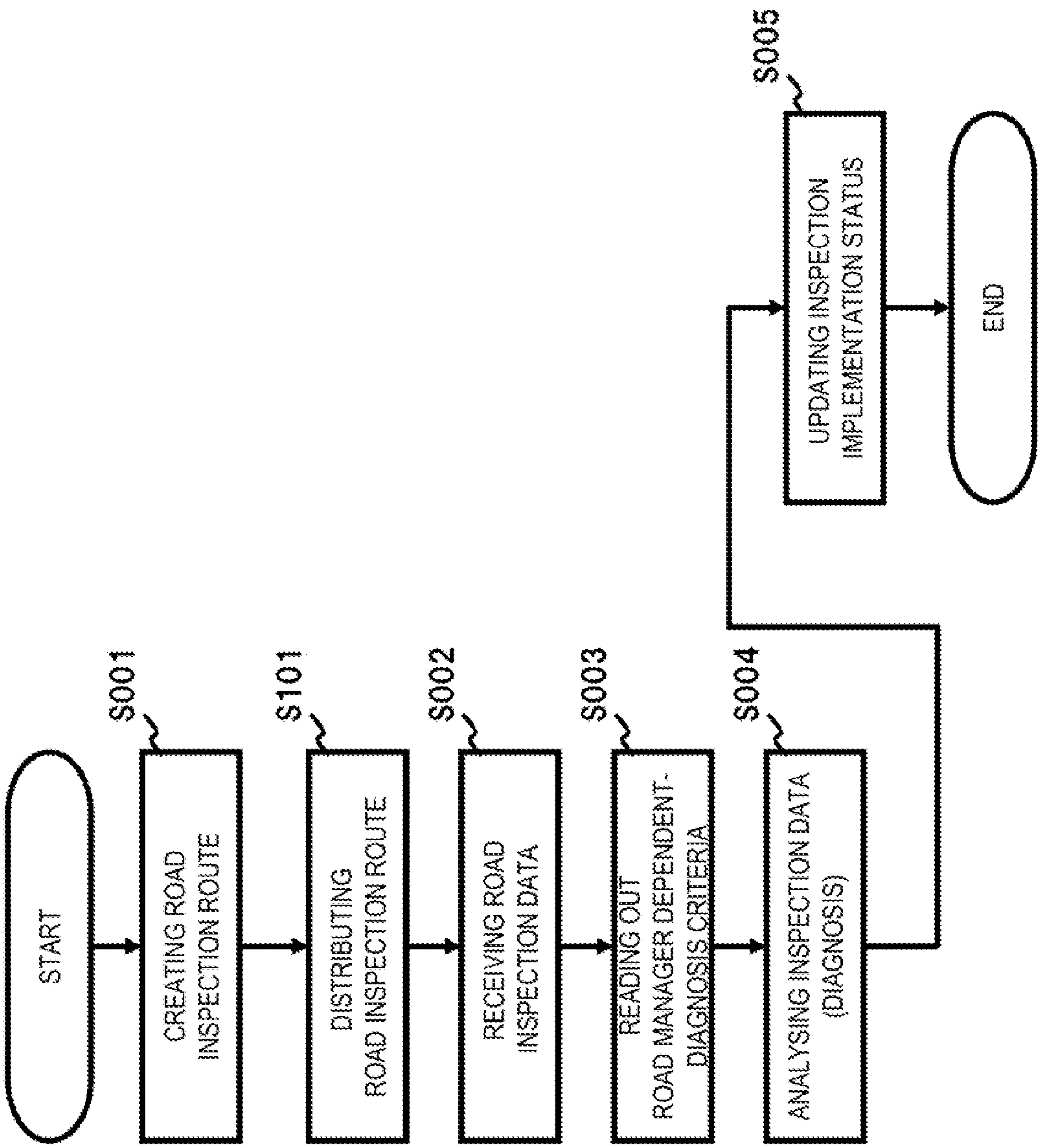
FIG. 9 is a flowchart showing operations by the road inspection system of the second example embodiment of the present invention.

FIG. 9 is a flowchart indicating operations by the road inspection system of the second example embodiment of the present invention. A difference from the operations by the road inspection system 100 of the first example embodiment as illustrated in FIG. 5 is a point that distribution of the road inspection route by the road inspection route distribution part 107 is executed (Step S101), after creation of the road inspection route by the road inspection system 100*a*.

Subsequent operations are the same with those of the first example embodiment. When receiving the inspection data from the vehicle (Step S002), the road inspection system 100*a* reads out diagnosis criteria of road managers of roads included in the road inspection route from the road manager dependent-diagnosis criteria storing part 105 (Step S003).

Next, the road inspection system 100*a* executes analysis of the inspection data (road diagnosis) using the read-out diagnosis criteria of the road managers (Step S004). Finally, the road inspection system 100*a* updates the inspection implementation status of the roads in the road information DB 101 using the road inspection route diagnosis result output from the diagnosis part 104 (Step S005).

As explained above, according to the present example embodiment, setting of the road inspection route on which the road inspection is performed is automated. Thereby, inspection data including a section which overlaps with the road inspection route may be received from a large number of vehicles. With respect to the same section, multiple sets of inspection data are received and diagnosed, thus the accuracy of the diagnostic result can be expected to improve.

As described above, each example embodiment of the present invention is explained. However, the present invention is not limited to the above example embodiments, and a further deformation, a further substitution and a further adjustment may be added to an extent that they do not depart from a basic technical idea of the present invention. For example, the system configurations, the configuration of each element, and expression modes of data illustrated in each drawing are an example to aid in understanding the present invention and are not limited to the configuration illustrated in these drawings.

For example, in the above first example embodiment, an example is explained, in which a combination of different road managers is the national government and a prefectural government. However, the combination of different road managers is not limited to this. For example, the present invention may be also similarly applied to a case where a first road manager is a prefecture government and a second road administrator is a municipality government. Of course, the present invention may be also similarly applied to a case that, in an area where roads of three or more different road managers are mixed together, roads of these three or more road managers are diagnosed.

Further, in a case where the vehicle performing the road inspection described above finds a localized pothole or the like, it may be equipped with a function to report it to the road inspection system 100, 100*a* side. The road inspection systems 100 and 100*a* may comprise a function to provide instructions to road managers of MAINTENANCE REQUIRED and REPAIRE REQUIRED.

Figure 10:
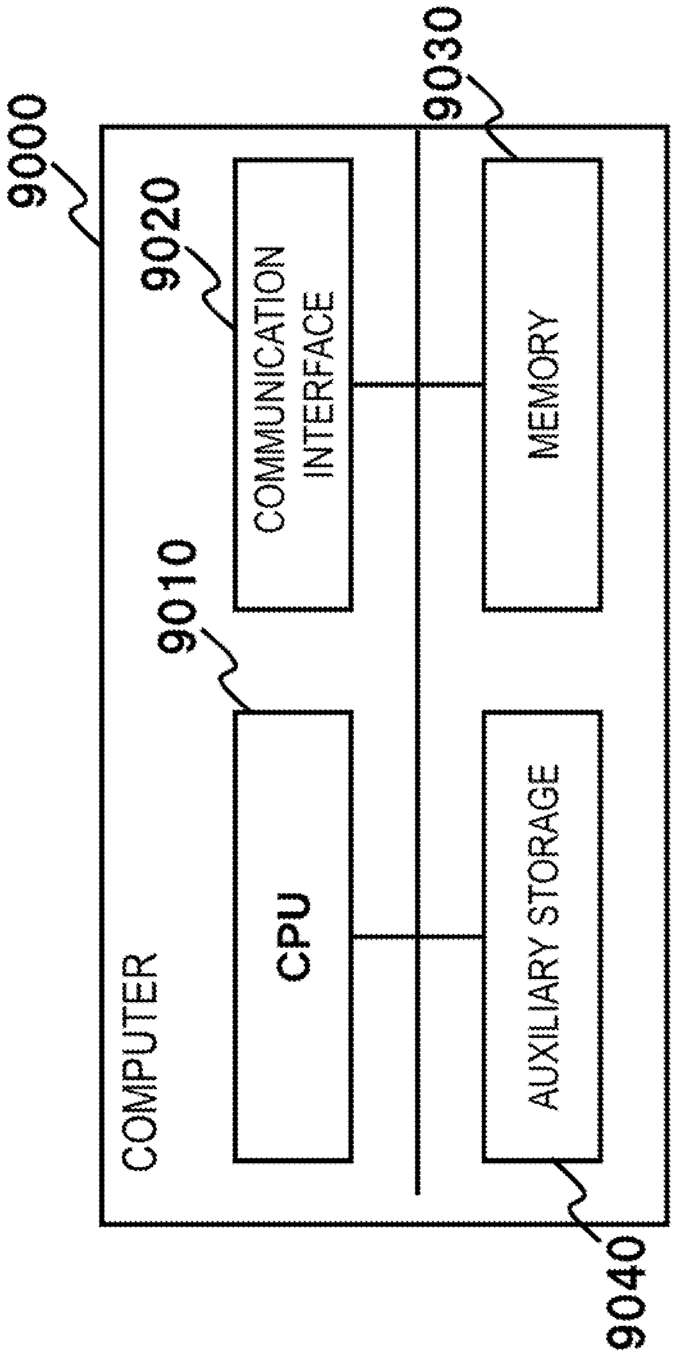
FIG. 10 is a diagram showing a configuration of a computer configuring a road inspection system of the present invention.

In addition, the operations described in the first to second example embodiments may be realized by a program that allows a computer (9000 in FIG. 10) functioning as the road inspection systems 100, 100*a*. Such computer is exemplified by a configuration in FIG. 10, that comprises a central processing unit (CPU) 9010, a communication interface 9020, a memory 9030, and an auxiliary storage 9040. That is, the CPU 9010 in FIG. 10 executes a road inspection route creation program and a data diagnosis program so as to implement an updating process of each calculation parameter held in its auxiliary storage 9040, etc.

That is, each part (processing mean and function) of the road inspection systems 100 and 100*a* described in each of the above example embodiments can be realized by a computer program that causes a processor in these apparatuses to perform each of the above processes using its hardware.

At the last, preferable modes of the present invention are summarized.

[First Mode]

(See the road inspection system according to the first aspect.)

[Second Mode]

A configuration may be adopted, where each of the first diagnosis criteria and the second diagnosis criteria, which is used by the road inspection system, has diagnosis criteria of road damage degree for each road class, and the road inspection system diagnoses the first inspection data and the second inspection data using diagnosis criteria, which are included in diagnosis criteria set by the first road manager and the second road manager and match with road classes of roads on which the inspection data is measured.

[Third Mode]

The road inspection system may adopt a configuration, where further comprising a means that creates an inspection operation state map in which the road inspection route is indicated on a map showing the first road and the second road, and a means that superimposes a result of analysis of the first inspection data using the first diagnosis criteria and a result of analysis of the second inspection data using the second diagnosis criteria respectively on the first road and the second road of the inspection operation state map.

[Fourth Mode]

The road inspection system may adopt a configuration, where comprising a means that distributes the road inspection route to a vehicle provided with an inspection apparatus that may create the inspection data.

[Fifth Mode]

(See the road inspection method according to the second aspect.)

[Sixth Mode]

(See the program according to the third aspect.)

Herein, the fifth to sixth modes may be developed to second to fourth modes, like as the first mode.

Herein, it is considered that each disclosure of the above Patent Literatures is incorporated herein by reference thereto, and the disclosures may be used as a base or a part of the present invention as necessary. Variations and adjustments of the example embodiments and examples are possible within the ambit of the entire disclosure (including the claims) of the present disclosure and based on the basic technical concept thereof. In addition, various combinations and selections (including non-selection) of various disclosed elements (including each element in each claim, each example embodiment, each drawing, etc.) are possible within the ambit of claims of the disclosure. Namely, the present disclosure of course includes various variations and modifications that could be made by those skilled in the art according to the overall disclosure including the claims and the technical concept. In particular, the numerical range described in the present application should be interpreted as specifically describing any numerical value or subrange that falls within that range, even if not otherwise stated. Further, each of the disclosed matters of the above cited literatures is regarded as included in the described matters in the present application, if required, on the basis of the concept of the present disclosure, as a part of the present disclosure, also that a part or entire thereof is used in combination with a described matter(s) in the present application.

REFERENCE SIGNS LIST

100, 100*a*: road inspection system
12, 102: road inspection route creation part
13, 103: inspection data reception part
14, 104: diagnosis part
11, 101: road information database (road information DB)
105: road manager dependent-diagnosis criteria storing part
106: diagnosis result reflection part
107: road inspection route distribution part
9000: computer
9010: CPU
9020: communication interface
9030: memory
9040: auxiliary storage

What is claimed is:

1. A road inspection system, comprising:

at least a processor; and a memory in circuit communication with the processor;

wherein the processor is configured to execute program instructions stored in the memory to implement:

creating a road inspection route including a first road managed by a first road manager and a second road managed by a second road manager which is different from the first road manager;

receiving inspection data from a vehicle that has traveled along a road inspection route, in which the inspection data is obtained by measurement of pre-set items along the road inspection route;

diagnosing a first inspection data, that is included in the inspection data and measured on the first road, using first diagnosis criteria of the first road manager; and diagnosing a second inspection data, that is included in the inspection data and measured on the second road, using second diagnosis criteria of the second road manager, and each of the first diagnosis criteria and the second diagnosis criteria has diagnosis criteria of road damage degree for each road class, and the processor is configured to further implement: diagnosing the first inspection data and the second inspection data using diagnosis criteria, which are included in diagnosis criteria set by the first road manager and the second road manager and match with road classes of roads on which the inspection data is measured.

2. The road inspection system according to claim 1, wherein the processor is configured to further implement:

creating an inspection operation state map in which the road inspection route is indicated on a map showing the first road and the second road, and superimposing a result of analysis of the first inspection data using the first diagnosis criteria and a result of analysis of the second inspection data using the second diagnosis criteria respectively on the first road and the second road of the inspection operation state map.

3. The road inspection system according to claim 1, wherein the processor is configured to further implement: distributing the road inspection route to a vehicle provided with an inspection apparatus that may create the inspection data.

4. A road inspection method, wherein a computer comprising a means that stores road data including a first road managed by a first road manager and a second road managed by a second road manager which is different from the first road manager executes:

creating a road inspection route including the first road managed by the first road manager and the second road managed by the second road manager which is different from the first road manager;

receiving inspection data from a vehicle that has traveled along a road inspection route, in which the inspection data is obtained by measurement of pre-set items along the road inspection route;

diagnosing a first inspection data, that is included in the inspection data and measured on the first road, using first diagnosis criteria of the first road manager; and diagnosing a second inspection data, that is included in the inspection data and measured on the second road, using second diagnosis criteria of the second road manager, and each of the first diagnosis criteria and the second diagnosis criteria has diagnosis criteria of road damage degree for each road class, and the computer diagnoses the first inspection data and the second inspection data using diagnosis criteria, which are included in diagnosis criteria set by the first road manager and the second road manager and match with road classes of roads on which the inspection data is measured.

5. The road inspection method according to claim 4, wherein the computer further executes:

creating an inspection operation state map in which the road inspection route is indicated on a map showing the first road and the second road, and superimposing a result of analysis of the first inspection data using the first diagnosis criteria and a result of analysis of the second inspection data using the second diagnosis criteria respectively on the first road and the second road of the inspection operation state map.

6. The road inspection method according to claim 4, wherein the computer further executes:

distributing the road inspection route to a vehicle provided with an inspection apparatus that may create the inspection data.

7. A computer recording medium storing a program, wherein the program makes a computer comprising a means that stores road data including a first road managed by a first road manager and a second road managed by a second road manager which is different from the first road manager to execute:

creating a road inspection route including the first road managed by the first road manager and the second road managed by the second road manager which is different from the first road manager;

receiving inspection data from a vehicle that has traveled along a road inspection route, in which the inspection data is obtained by measurement of pre-set items along the road inspection route;

diagnosing a first inspection data, that is included in the inspection data and measured on the first road, using first diagnosis criteria of the first road manager; and diagnosing a second inspection data, that is included in the inspection data and measured on the second road, using second diagnosis criteria of the second road manager, and each of the first diagnosis criteria and the second diagnosis criteria has diagnosis criteria of road damage degree for each road class, and the program makes the computer to further execute: diagnosing the first inspection data and the second inspection data using diagnosis criteria, which are included in diagnosis criteria set by the first road manager and the second road manager and match with road classes of roads on which the inspection data is measured.

8. The computer recording medium according to claim 7, wherein the program makes the computer to further execute: creating an inspection operation state map in which the road inspection route is indicated on a map showing the first road and the second road, and superimposing a result of analysis of the first inspection data using the first diagnosis criteria and a result of analysis of the second inspection data using the second diagnosis criteria respectively on the first road and the second road of the inspection operation state map.

9. The computer recording medium according to claim 7, wherein the program makes the computer to further execute:

distributing the road inspection route to a vehicle provided with an inspection apparatus that may create the inspection data.

* * * * *